United States Patent
Deo

(10) Patent No.: US 9,398,492 B2
(45) Date of Patent: Jul. 19, 2016

(54) METHODS, SYSTEMS, AND COMPUTER READABLE MEDIA FOR PROVIDING POLICY AND CHARGING RULES FUNCTION (PCRF) WITH INTEGRATED OPENFLOW CONTROLLER

(71) Applicant: Tekelec, Inc., Morrisville, NC (US)

(72) Inventor: Ajay Padmakar Deo, Carrollton, TX (US)

(73) Assignee: TEKELEC, INC., Morrisville, NC (US)

( * ) Notice: Subject to any disclaimer, the term of this patent is extended or adjusted under 35 U.S.C. 154(b) by 175 days.

(21) Appl. No.: 13/917,200

(22) Filed: Jun. 13, 2013

(65) Prior Publication Data

US 2013/0343295 A1    Dec. 26, 2013

Related U.S. Application Data

(60) Provisional application No. 61/659,967, filed on Jun. 14, 2012.

(51) Int. Cl.
| | | |
|---|---|---|
| *H04W 28/16* | (2009.01) | |
| *H04L 12/24* | (2006.01) | |
| *H04M 15/00* | (2006.01) | |
| *H04W 72/04* | (2009.01) | |

(52) U.S. Cl.
CPC ........... *H04W 28/16* (2013.01); *H04L 41/0813* (2013.01); *H04L 41/0893* (2013.01); *H04L 41/5022* (2013.01); *H04M 15/66* (2013.01); *H04W 72/04* (2013.01)

(58) Field of Classification Search
None
See application file for complete search history.

(56) References Cited

U.S. PATENT DOCUMENTS

| | | |
|---|---|---|
| 8,665,717 B2 | 3/2014 | Kotecha et al. |
| 2002/0091810 A1 | 7/2002 | Hundscheidt et al. |
| 2009/0232011 A1 | 9/2009 | Li et al. |
| 2009/0327079 A1 | 12/2009 | Parker et al. |
| 2010/0071035 A1 | 3/2010 | Budko et al. |
| 2010/0103861 A1 | 4/2010 | Ulupinar et al. |
| 2010/0125477 A1 | 5/2010 | Mousseau et al. |
| 2010/0211956 A1 | 8/2010 | Gopisetty et al. |
| 2010/0217850 A1 | 8/2010 | Ferris |
| 2011/0016467 A1 | 1/2011 | Kane |

(Continued)

FOREIGN PATENT DOCUMENTS

| | | |
|---|---|---|
| KR | 10-2009-0033968 | 4/2009 |
| KR | 10-2012-0055955 | 6/2012 |

(Continued)

OTHER PUBLICATIONS

"OpenFlow Switch Specification, Version 1.1.0 Implemented (Wire Protocol 0x02)," pp. 1-56 (Feb. 28, 2011).

(Continued)

*Primary Examiner* — Khoa Huynh
(74) *Attorney, Agent, or Firm* — Jenkins, Wilson, Taylor & Hunt, P.A.

(57) ABSTRACT

The subject matter described herein includes methods, systems, and computer readable media for providing a PCRF with an integrated openflow controller. According to one system, a policy and charging rules function (PCRF) is configured to determine policies to apply to network sessions or users. An openflow controller is integrated with the PCRF and configured to provide instructions to telecommunications network elements in an openflow protocol to implement the policies.

10 Claims, 3 Drawing Sheets

(56) References Cited

U.S. PATENT DOCUMENTS

| | | | |
|---|---|---|---|
| 2011/0200053 A1 | 8/2011 | Kanode et al. | |
| 2011/0202676 A1 | 8/2011 | Craig et al. | |
| 2012/0123870 A1 | 5/2012 | Denman et al. | |
| 2012/0140665 A1 | 6/2012 | Li et al. | |
| 2012/0158994 A1 | 6/2012 | McNamee et al. | |
| 2012/0300615 A1 | 11/2012 | Kempf et al. | |
| 2012/0303835 A1* | 11/2012 | Kempf | H04W 24/02 709/235 |
| 2013/0003745 A1 | 1/2013 | Nishimura | |
| 2013/0044645 A1 | 2/2013 | Castro Castro et al. | |
| 2013/0064093 A1 | 3/2013 | Ridel et al. | |
| 2013/0086279 A1 | 4/2013 | Archer et al. | |
| 2013/0124712 A1 | 5/2013 | Parker | |
| 2013/0250770 A1 | 9/2013 | Zou et al. | |
| 2013/0263208 A1 | 10/2013 | Challa | |
| 2014/0026231 A1 | 1/2014 | Barak et al. | |
| 2014/0059678 A1 | 2/2014 | Parker | |
| 2014/0105140 A1 | 4/2014 | Guo | |
| 2014/0172739 A1 | 6/2014 | Anderson et al. | |
| 2014/0189137 A1 | 7/2014 | Castro Castro et al. | |
| 2014/0193154 A1 | 7/2014 | Graham et al. | |
| 2014/0204796 A1 | 7/2014 | Bantukul | |
| 2014/0233389 A1 | 8/2014 | Bantukul et al. | |
| 2014/0237111 A1 | 8/2014 | McMurry et al. | |
| 2014/0304416 A1 | 10/2014 | Khasnabish | |
| 2014/0310388 A1 | 10/2014 | Djukic et al. | |
| 2014/0348068 A1* | 11/2014 | Morper | H04W 88/16 370/328 |
| 2015/0142940 A1 | 5/2015 | McMurry et al. | |
| 2015/0149656 A1 | 5/2015 | McMurry et al. | |
| 2015/0215228 A1 | 7/2015 | McMurry | |

FOREIGN PATENT DOCUMENTS

| | | |
|---|---|---|
| KR | 10-2012-0059542 | 6/2012 |
| WO | WO 2012/055446 A1 | 5/2012 |
| WO | WO 2012/063106 A1 | 5/2012 |
| WO | WO 2012/100092 A2 | 7/2012 |
| WO | WO 2012/149954 A1 | 11/2012 |
| WO | WO 2012/160465 A1 | 11/2012 |
| WO | WO 2014/127346 A1 | 8/2014 |
| WO | WO 2014/127347 A1 | 8/2014 |
| WO | WO 2015/077377 A1 | 5/2015 |
| WO | WO 2015/080906 A1 | 6/2015 |
| WO | WO 2015/116449 A1 | 8/2015 |

OTHER PUBLICATIONS

3rd Generation Partnership Project, "Technical Specification Group Services and System Aspects; Policy and charging control architecture (Release 9)," 3GPP TS 23.203 V9.3.0 (Dec. 2009).

Commonly-assigned, co-pending International Application No. PCT/US15/12250 for "Methods, Systems, and Computer Readable Media for a Cloud-Based Virtualization Orchestrator," (Unpublished, filed Jan. 21, 2015).

Commonly-assigned, co-pending International Application No. PCT/US14/66469 for "Methods, Systems, and Computer Readable Media for a Network Function Virtualization Information Concentrator," (Unpublished, filed Nov. 19, 2014).

Commonly-assigned, co-pending International Application No. PCT/US14/66240 for "Methods, Systems, and Computer Readable Media for Diameter Routing Using Software Defined Network (SDN) Functionality," (Unpublished, filed Nov. 18, 2014).

Non-Final Office Action for U.S. Appl. No. 13/749,655 (Sep. 3, 2014).

Notification of Transmittal of the International Search Report and the Written Opinion of the International Searching Authority, or the Declaration for International Application No. PCT/US2014/016853 (Jun. 6, 2014).

Notification of Transmittal of the International Search Report and the Written Opinion of the International Searching Authority, or the Declaration for International Application No. PCT/US2014/016860 (Jun. 4, 2014).

Notification of Transmittal of the International Search Report and the Written Opinion of the International Searching Authority, or the Declaration for International Application No. PCT/US2014/011551 (Apr. 28, 2014).

Commonly-assigned, co-pending U.S. Appl. No. 14/166,790 for "Methods, Systems, and Computer Readable Media for a Cloud-Based Virtualization Orchestrator," (Unpublished, filed Jan. 28, 2014).

Commonly-assigned, co-pending International Application No. PCT/US14/11551 for "Methods, Systems, and Computer Readable Media for Using Policy Knowledge of or Obtained by a Policy and Charging Rules Function (PCRF) for Needs Based Forwarding of Bearer Sessions Traffic to Network Nodes," (Unpublished, filed January).

Commonly-assigned, co-pending U.S. Appl. No. 14/086,950 for "Methods, Systems, and Computer Readable Media for a Network Function Virtualization Information Concentrator," (Unpublished, filed Nov. 21, 2013).

Notification of Transmittal of the International Search Report and the Written Opinion of the International Searching Authority, or the Declaration for International Application No. PCT/US2013/045652 (Sep. 17, 2013).

Wendong et al., "Autonomicity Design in OpenFlow Based Software Defined Networking," GC'12 Workshop: The 4th IEEE International Workshop on Management of Emerging Networks and Services, pp. 818-823 (Dec. 3, 2012).

"3rd Generation Partnership Project; Technical Specification Group Services and System Aspects; Policy and charging control architecture (Release 11)," 3GPP TS 23.203, V11.8.0 pp. 1-179 (Dec. 2012).

Fajardo et al., "Diameter Base Protocol," RFC 6733, pp. 1-152 (Oct. 2012).

"Software-Defined Networking: The New Norm for Networks," ONF White Paper, Open Networking Foundation, pp. 1-12 (Apr. 13, 2012).

Chapman et al., "Software architecture definition for on-demand cloud provisioning," Cluster Computing, vol. 15, No. 2, pp. 79-100 Feb. 27, 2011).

Dörnemann et al., "On-Demand Resource Provisioning for BPEL Workflows Using Amazon's Elastic Compute Cloud," 9th IEEE/ACM International Symposium on Cluster Computing and the Grid, pp. 140-147 (May 18, 2009).

"Introduction to Evolved Packet Core," White Paper, Alcatel-Lucent, 11 pgs. (2009).

Notification of Transmittal of the International Search Report and the Written Opinion of the International Searching Authority, or the Declaration for International Application No. PCT/US2014/066240 (May 13, 2015).

Final Office Action for U.S. Appl. No. 13/749,655 (Apr. 3, 2015).

Notification of Transmittal of the International Search Report and the Written Opinion of the International Searching Authority, or the Declaration for PCT International Application No. PCT/US2015/012250 (Mar. 31, 2015).

Communication of European Publication Number and Information on the Application of Article 67(3) EPC for European Application No. 13804779.0 (Mar. 25, 2015).

Notification of Transmittal of the International Search Report and the Written Opinion of the International Searching Authority, or the Declaration for International Application No. PCT/US2014/066469 (Feb. 20, 2015).

"Network Function Virtualization (NFV) Management and Orchestration," ETSI, Group Specification, GS NFV-MAN 001 V0.0.11, pp. 1-74 (Oct. 18, 2013).

"Split Architecture for Large Scale Wide Area Networks," SPARC ICT-258457 Deliverable D3.3, pp. 1-129 (Dec. 1, 2011).

Amendment for U.S. Appl. No. 13/749,655 (Jul. 6, 2015).

Commonly-assigned, co-pending U.S. Appl. No. 14/692,710 for "Methods, Systems, and Computer Readable Media for Multi-Layer Orchestration in Software Defined Networks (SDNs)," (Unpublished, filed Apr. 21, 2015).

Extended European Search Report for European Application No. 13804779.0 (Jan. 19, 2016).

Applicant-Initiated Interview Summary for U.S. Appl. No. 14/092,898 (Jan. 14, 2016).

(56) References Cited

OTHER PUBLICATIONS

Non-Final Office Action for U.S. Appl. No. 13/749,655 (Dec. 31, 2015).
Applicant-Initiated Interview Summary for U.S. Appl. No. 14/182,864 (Dec. 16, 2015).
Non-Final Office Action for U.S. Appl. No. 14/086,950 (Dec. 4, 2015).
Supplemental Notice of Allowability for U.S. Appl. No. 14/182,800 (Dec. 1, 2015).
Communication of European Publication Number and Information on the Application of Article 67(3) EPC for European Patent Application No. 14710682.7 (Nov. 25, 2015).
Notice of Allowance and Fee(s) Due for U.S. Appl. No. 14/182,800 (Nov. 10, 2015).
Communication of European Publication Number and Information on the Application of Article 67(3) EPC for European Patent Application No. 14703974.7 (Nov. 4, 2015).
Non-Final Office Action for U.S. Appl. No. 14/092,898 (Oct. 8, 2015).
Non-Final Office Action for U.S. Appl. No. 14/182,864 (Sep. 23, 2015).
Advisory Action Before the Filing of an Appeal Brief, Examiner-Initiated Interview Summary and AFCP 2.0 Decision for U.S. Appl. No. 13/749,655 (Jul. 24, 2015).
Kempf et al., "Moving the Mobile Evolved Packet Core to the Cloud," 2012 Fifth International Workshop on Selected Topics in Mobile and Wireless Computing, pp. 1-8 (Oct. 8, 2012).
Li Erran et al., "CellSDN: Software-Defined Cellular Networks," ftp://ftp.cs.princeton.edu/techeports/2012/922.pdf, pp. 1-6 (Apr. 20, 2012).

\* cited by examiner

METHODS, SYSTEMS, AND COMPUTER READABLE MEDIA FOR PROVIDING POLICY AND CHARGING RULES FUNCTION (PCRF) WITH INTEGRATED OPENFLOW CONTROLLER

PRIORITY CLAIM

This application claims the benefit of U.S. Provisional Patent Application Ser. No. 61/659,967 filed Jun. 14, 2012; the disclosure of which is incorporated herein by reference in its entirety.

TECHNICAL FIELD

The subject matter described herein relates to enabling flexible allocation of resources in telecommunications networks. More particularly, the subject matter described herein relates to a PCRF with an integrated openflow controller.

BACKGROUND

In telecommunications networks, global Internet protocol traffic is increasing at a rate of forty to fifty percent per year. In order to retain subscribers, it is desirable for service providers to keep monthly charges to subscribers relatively unchanged. Keeping charges constant with increasing traffic requires a reduction in expenses. For example, with a forty percent increase in traffic, service providers must reduce capital expenses and operational expenses by forty to fifty percent per gigabyte per second per year to achieve relatively constant pricing.

One possible method for reducing capital and operational expenses is to use software defined networks (SDNs). SDNs can be used to manage flows, control switches, control network access, and track user location and motion. SDNs can also be used to efficiently use network components. For example, SDNs may be used to power off unused equipment during non-peak periods to conserve energy.

Some SDN models centralize the control of network elements, such as routers and switches, by removing intelligence from the routers and switches and placing that intelligence in a centralized location. One such effort to provide centralized control of routers and switches is the openflow architecture described in the Openflow Switch Specification, Version 1.1.0, Feb. 28, 2011, the disclosure of which is incorporated herein by reference in its entirety and a copy of which is attached hereto. According to the Openflow Switch Specification, an openflow controller controls functions of openflow-enabled switches. Openflow has not been used to control telecommunications network elements. Accordingly, there exists a need for extending openflow into telecommunications networks to reduce operating and capital expenses and to make networks more scalable and more flexible.

SUMMARY

The subject matter described herein includes methods, systems, and computer readable media for providing a PCRF with an integrated openflow controller. According to one system, a policy and charging rules function (PCRF) is configured to determine policies to apply to network sessions or users. An openflow controller is integrated with the PCRF and configured to provide instructions to telecommunications network elements in an openflow protocol to implement the policies.

The subject matter described herein can be implemented in software in combination with hardware and/or firmware. For example, the subject matter described herein may be implemented in software executed by one or more processors. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, of which.

DETAILED DESCRIPTION

Figure 1:
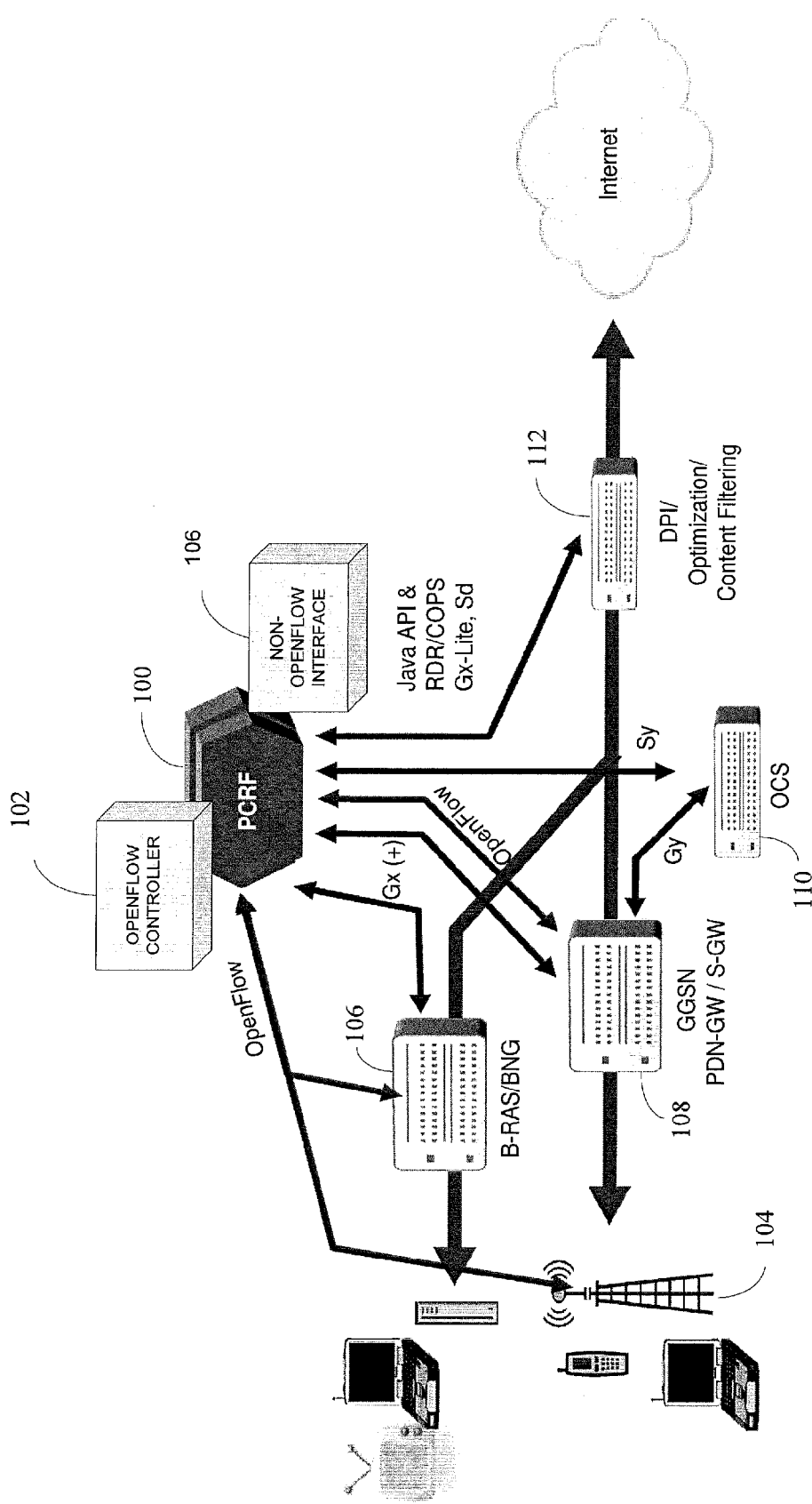
FIG. 1 is a network diagram illustrating a PCRF with an integrated openflow controller controlling telecommunications network elements according to an embodiment of the subject matter described herein.

The subject matter described herein includes a PCRF with an integrated openflow controller. FIG. 1 illustrates an example of such a PCRF. In FIG. 1 PCRF 100 includes integrated openflow controller 102. Openflow controller 102 implements the above-described openflow protocol to control one or more of eNode B 104, BRAS/BNG 106, GGSN or PDN-GW/S-GW 108, a Wi-Fi access point (not shown) or one or more openflow switches or routers (not shown). In the illustrated example, PCRF 100 also includes a non-openflow interface 109 for controlling non-openflow devices, such as online charging system (OCS) 110 or deep packet inspection (DPI) node 112. Non-openflow interface 109 may be a Diameter interface or other suitable interface for communicating with non-openflow nodes, such as OCS 110 and DPI 112.

Conventionally, the network in FIG. 1 operated by providing much of the routing intelligence in nodes 104, 106, and 108. PCRF 100 conventionally controlled such nodes using only a layer 7 protocol, such as Diameter. In the illustrated embodiment, PCRF 100 may include at least some of the same routing intelligence conventionally contained in nodes 104, 106, and 108 and use openflow controller 102 to control switching and routing performed by nodes 104, 106, and 108. Thus, PCRF 100 may control nodes using the openflow protocol in addition to or instead of a layer 7 protocol, such as Diameter.

Figure 2:
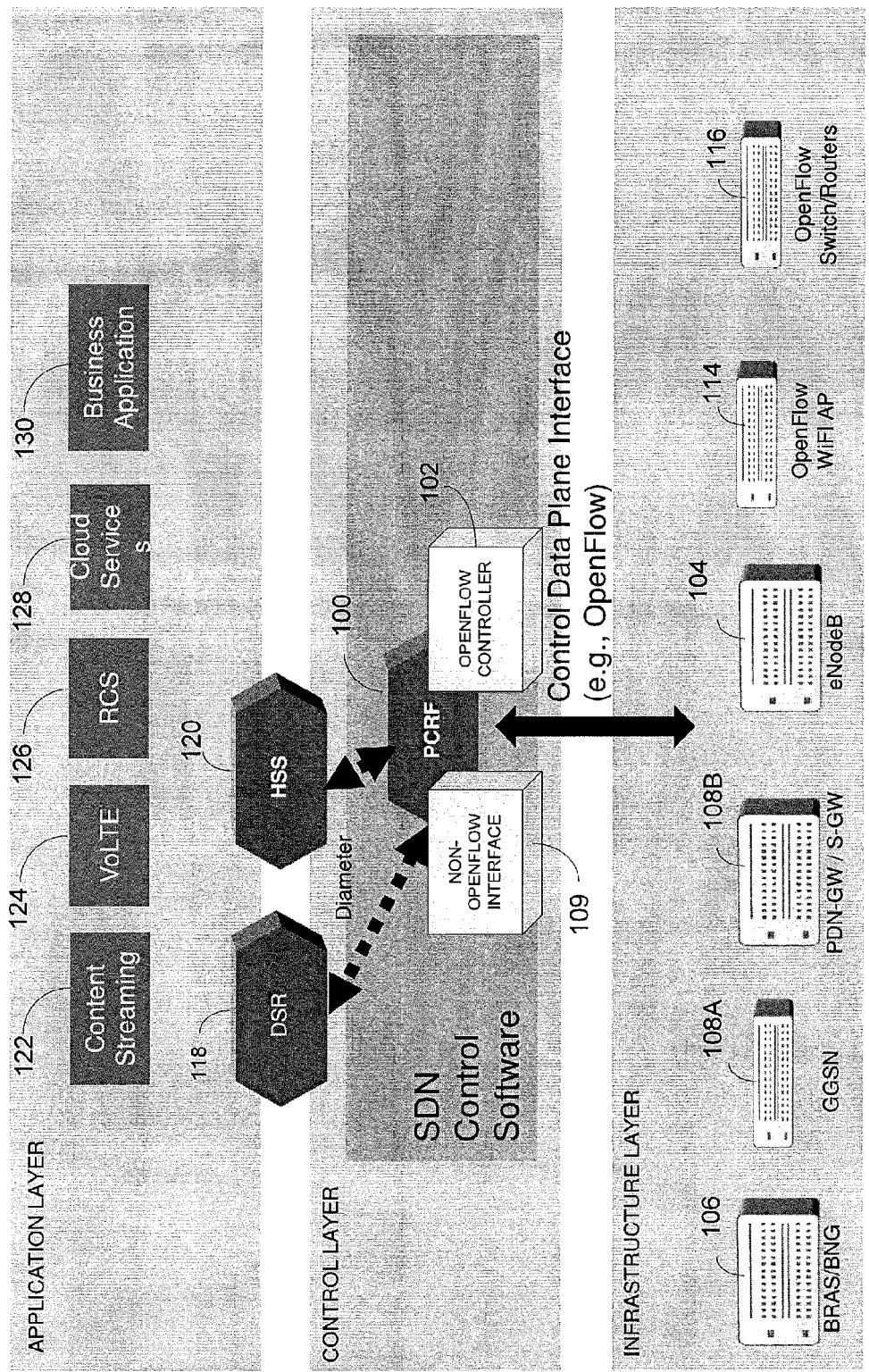
FIG. 2 is a block diagram illustrating an exemplary architecture for an SDN including an openflow-enabled PCRF according to an embodiment of the subject matter described herein.

FIG. 2 is a block diagram illustrating an exemplary architecture for a software-defined network including PCRF 100 with integrated openflow controller 102. Referring to FIG. 2, PCRF 100 controls BRAS/BNG 106, GGSN 108A, PDN-GW/S-GW 108B, eNode B 104, Wi-Fi access point 114 and openflow switches/routers 116 using openflow. PCRF 100 may also communicate with DSR 118 and HSS 120 using any suitable protocol, such as Diameter. PCRF 100 may support various applications, such as content streaming 122, voice over LTE 124, rich communications suite (RCS) 126, cloud services 128, and business applications 130.

Figure 3:
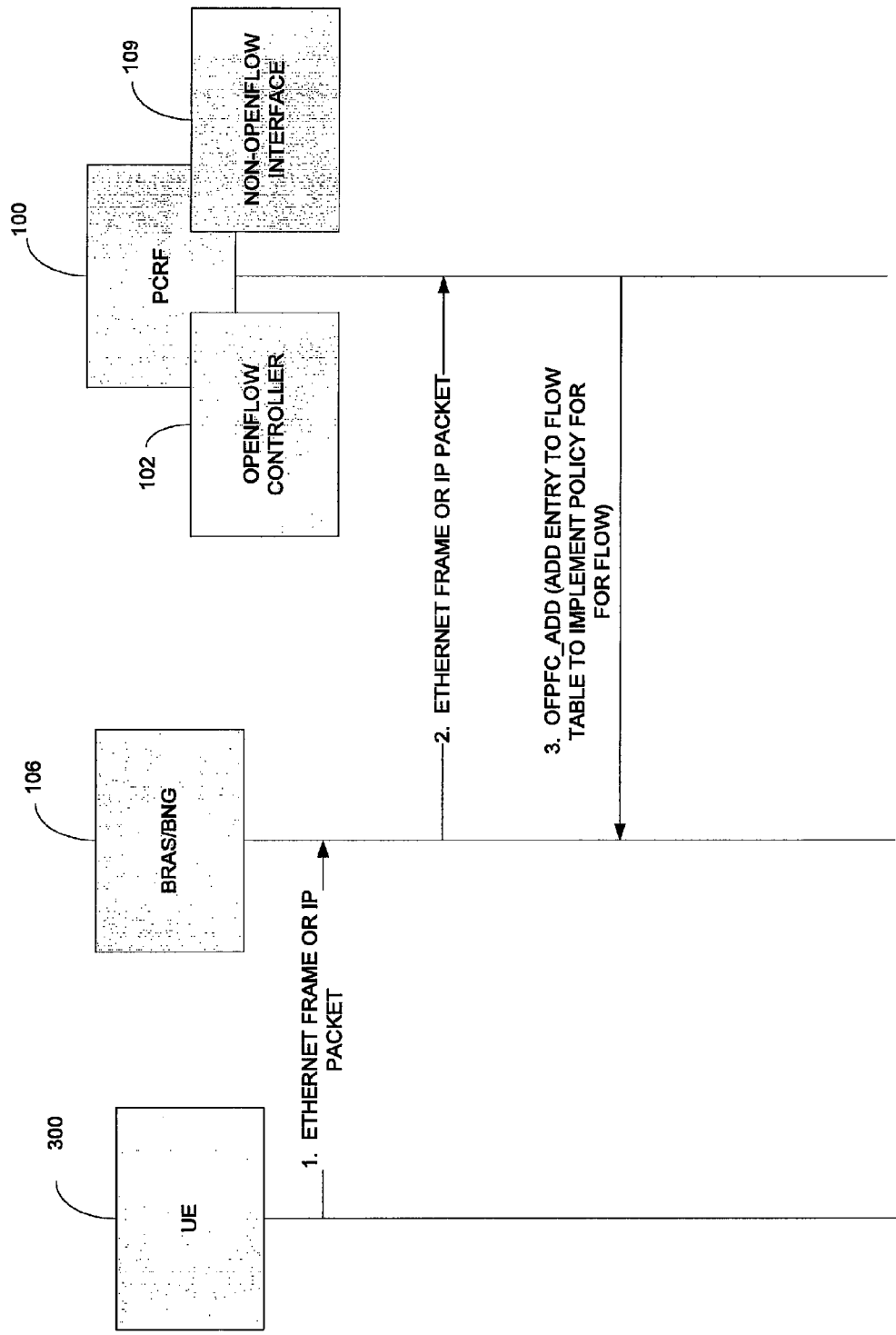
FIG. 3 is a message flow diagram illustrating exemplary messaging for a PCRF to provide policy instructions to telecommunications network nodes via using an openflow protocol according to an embodiment of the subject matter described herein.

FIG. 3 is a flow diagram illustrating exemplary messages that may be exchanges exchanged when a node such as BRAS/BNG 106 is controlled by PCRF 100 using openflow. Referring to FIG. 3, in line 1, a user element 300 sends an initial Ethernet frame or an IP packet to the network. BRAS/BNG 106 receives the frame or packet, performs a lookup in its flow table, and determines that there are no matching entries. Accordingly, in line 2, BRAS/BNG 106 sends the frame or packet to PCRF 100 to determine what policy to apply to the frame or packet and to subsequent frames or packets in the same flow as the Ethernet frame or IP packet. Openflow controller 102 receives the frame or packet and determines the policy to apply to the frame or packet. In line 3, openflow controller 102 sends an openflow add command instructing BRAS/BNG 106 to add an entry to its flow table to implement a policy for frames associated with the same flow as the received Ethernet frame. Subsequent Ethernet frames or IP packets associated with the same flow may be switched by BRAS/BNG 106 using the entry added to its flow table by openflow controller 102.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. A system for providing a policy controlling network, the system comprising:
    a policy and charging rules function (PCRF) configured to determine policies to apply to network sessions or users, wherein the PCRF is configured to receive, from a broadband remote access server/broadband network gateway (BRAS/BNG), an initial frame or packet to determine what policy to apply to subsequent frames or packets associated with the same flow as the initial frame or packet; and
    an openflow controller integrated with the PCRF and configured to provide instructions to telecommunications network elements in an openflow protocol to implement the policies, wherein the PCRF with the integrated openflow controller comprises an openflow-enabled PCRF that controls nodes using the openflow protocol, wherein the openflow controller receives the initial frame or packet, determines the policy to apply to the subsequent frames or packets and sends an openflow command to the BRAS/BNG to add an entry to a flow table of the BRAS/BNG to implement the policy for the subsequent frames or packets associated with the same flow as the initial frame or packet.

2. The system of claim 1 wherein the openflow controller is configured to provide instructions in the openflow protocol to one or more of the BRAS/BNG, a gateway GPRS support node (GGSN), a packet data network gateway/server gateway (PDN-GW/S-GW), an evolved node B (eNode B).

3. The system of claim 1 wherein the openflow controller is configured to provide instructions in the openflow protocol to one or more of a Wi-Fi access point, a switch, and a router.

4. The system of claim 1 wherein the PCRF includes a non-openflow interface for providing instructions to at least some of the telecommunications network elements using a non-openflow protocol.

5. The system of claim 4 wherein the non-openflow protocol comprises a Diameter protocol.

6. The system of claim 1 wherein the PCRF is configured to communicate with a home subscriber server (HSS) using Diameter.

7. The system of claim 1 wherein the PCRF is configured to communicate with a Diameter signaling router (DSR) using Diameter.

8. The system of claim 1 wherein the PCRF includes a non-openflow interface for controlling non-openflow devices.

9. The system of claim 8 wherein the non-openflow devices include an online charging system (OCS).

10. The system of claim 8 wherein the non-openflow devices include a deep packet inspection (DPI) node.

* * * * *